US006519047B1

(12) United States Patent
Ahn

(10) Patent No.: US 6,519,047 B1
(45) Date of Patent: Feb. 11, 2003

(54) MULTIFUNCTIONAL MACHINE PERFORMING A SHUTTLE-SCANNING

(75) Inventor: Byung-Sun Ahn, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 23 days.

(21) Appl. No.: 09/702,812

(22) Filed: Nov. 1, 2000

Related U.S. Application Data

(62) Division of application No. 08/964,364, filed on Nov. 4, 1997, now Pat. No. 6,139,206.

(30) Foreign Application Priority Data

Nov. 4, 1996 (KR) ........................................ 96-51893
Nov. 4, 1996 (KR) ........................................ 96-51894

(51) Int. Cl.[7] ........................................ G06F 15/00

(52) U.S. Cl. .................... 358/1.12; 358/472; 358/494; 358/497; 347/3; 347/4; 400/323; 400/82

(58) Field of Search ............................ 358/1.12, 494, 358/497, 472; 400/323, 82, 88; 347/3, 104, 129, 133, 139, 117, 118

(56) References Cited

U.S. PATENT DOCUMENTS 4,839,741 A * 6/1989 Wilson ...................... 358/404
5,114,139 A * 5/1992 Kodama ............... 271/265.01

* cited by examiner

*Primary Examiner*—Mark Wallerson
*Assistant Examiner*—Twyler Lamb
(74) *Attorney, Agent, or Firm*—Robert E. Bushnell, Esq.

(57) ABSTRACT

A multifunctional machine prevents contamination caused by the contact of a document and a printhead by placing the printhead to face a base frame supporting a printable mediumu, and by placing a scanner to face the base frame supporting the document. The multifunctional machine is also capable of simplifying the structure and reducing the manufacturing costs by sharing the base frame for supporting the printable medium and the document, and by moving the printhead and the scanner using one driving motor.

24 Claims, 5 Drawing Sheets

MULTIFUNCTIONAL MACHINE PERFORMING A SHUTTLE-SCANNING

CROSS-REFERENCE TO RELATED APPLICATIONS

This application is a divisional of Applicant's Ser. No. 08/964,364 filed in the U.S. Patent & Trademark Office on Nov. 4, 1997 now U.S. Pat. No. 6,139,206 and assigned to the assignee of the present invention.

CLAIM OF PRIORITY

This application makes reference to, incorporates the same herein, and claims all benefits accruing under 35 U.S.C. §119 from an application entitled *Multifunctional Machine Performing A Shuttle-Scanning* earlier filed in the Korean Industrial Property Office on Nov. 4, 1996, and there duly assigned Ser. No. 96-51893 and No. 96-51894 by that Office.

BACKGROUND OF THE INVENTION

1. Field of the Invention

The present invention relates to a multifunctional machine, and particularly to a multifunctional machine which prevents the contamination caused by the contact of a document and a printhead by placing the printhead to face a base frame supporting a printable medium and placing a scanner to face the base frame supporting the document.

Further, the present invention relates to a multifunctional machine capable of simplifying structure and reducing manufacturing costs by sharing the base frame for supporting the printable medium and the document, and by moving the printhead and the scanner using one driving motor.

2. Description of the Related Art

First, a printable medium, which is referred to in the specification, indicates a medium capable of recording a predetermined information such as a printing paper.

Nowadays, office automation facilities such as a printer, a scanner, a duplicator, a facsimile, etc. have become widespread. To extend their own functions, these office automation facilities each having high efficiency have been developed. Accordingly, the manufacturing costs of the products increase and this may impose an economic burden on users. To solve the problem, by integrating the office automation facilities which have separately been used into a multifunctional device, the economic burden on users can be lessened.

Conventionally, the multifunctional machine includes a document scanning unit and a printing unit which separately perform the scanning and printing operations.

The multifunctional machine has a common path for transporting both the document and the printable medium, and an image scanning sensor which is integrated at a high density is separately mounted at a printhead carriage housing. When scanning the document, an ink-jet printhead and the image scanning sensor perform reciprocation on the document in a direction perpendicular to the document transporting direction by means of a carriage motor along a carriage shaft. At this time, the image scanning sensor scans data from the document. After the scanning is completed once, the document is transported by as much as a predetermined length by a document transporting motor. By repeatedly performing the above-described process, the document scanning is completed.

In the case of the multifunctional machine in which the image scanning sensor is attached to the printhead carriage housing, as the ink-jet printhead and the image scanning sensor move together, the surface of the document is always contacted with an ink injection unit of the printhead. As a result, when performing the scanning operation, as the ink is spread on the surface of the document due to the contact of the ink injection unit of the printhead and the surface of the document, the image on the document can be damaged.

In the case where the interval between the printhead and the printable medium is larger than the interval between the image scanning sensor and the document, the ink injected on the printable medium, which is not yet dry, is contacted by the surface of the image scanning sensor, thereby causing a poor image quality Moreover, when picking up the document, as the surface of the document is contaminated by a pickup roller caused by the friction between the surface of the document and the pickup roller, the data on the document can be damaged.

To solve the above problems, a multifunctional machine which has two different paths for transporting the document and the printable medium, and which drives the printhead and the image scanning sensor by means of different driving sources, has been presented. However, as the separate driving sources are used to drive the printhead and the image scanning sensor, and also to transport the printable medium and the document, the manufacturing cost increases and the space required for setting up the machine becomes large.

SUMMARY OF THE INVENTION

Therefore, it is an object of the present invention to provide a multifunctional machine which prevents the image on the document from being damaged by a pickup roller and a printhead when scanning, and which prevents deterioration of the printed image by an image scanning sensor when printing, the printhead and the image scanning sensor being perpendicular to the document or the transporting direction and simultaneously separated from each other by as much as a predetermined distance respectively perpendicular to the reciprocating direction.

It is another object of the present invention to provide a multifunctional machine in which the printhead and the image scanning sensor are perpendicular to the document or the transporting direction and simultaneously separated from each other by as much as a predetermined distance respectively perpendicular to the reciprocating direction, which reduces the manufacturing costs by simplifying the structure, and which reduces the volume of the product, by driving the printhead and the image scanning sensor by means of one driving unit and transporting the document and printable medium by means of one transporting motor.

According to one aspect of the present invention, a scanning unit scans the document by reciprocating perpendicular to the document transporting direction; a printing unit prints on the printable medium by reciprocating perpendicular to the printable medium transporting direction; and the printing unit and the scanning unit are separated from each other by as much as a predetermined distance respectively perpendicular to the reciprocating direction.

In one preferred embodiment, the printing unit and the scanning unit are respectively opposite to each other, and a path for transporting the document and the printable medium is formed therebetween.

In another preferred embodiment, the printing unit and the scanning unit are formed to be in the same direction, and the paths for transporting the document and the printable medium are respectively oppositely formed on the scanning unit and the printing unit.

Preferably, the printing unit and the scanning unit are simultaneously driven by one driving source. A scanning unit scans the document on the base frame by reciprocating perpendicular to the document transporting direction; and a printing unit is located opposite to the scanning unit centering around the base frame and prints on the printable medium on the base frame by reciprocating perpendicular to the printable medium transporting direction.

According to the present invention, the printing unit and the scanning unit are simultaneously driven by one driving source and receive a driving force from the driving source through a belt.

Preferably, on the base frame, a slot having a length corresponding to the width where the scanning unit performs reciprocation is formed. A protection plate of transparent material is preferably inserted into the slot.

According to the present invention, a first guide shaft for guiding the reciprocation of the scanning unit is provided to equally maintain the interval between the scanning unit and the document and between the printing unit and the printable medium; and a second guide shaft for guiding the reciprocation of the printing unit and located parallel to the first guide shaft is provided.

Moreover, the scanning unit and the printing unit reciprocate in a same direction, and they are separated from each other by as much as a predetermined distance perpendicular to the transporting direction. Alternatively, the scanning unit and the printing unit reciprocate in opposite directions, and they are separated from each other by as much as the width where the reciprocation is performed.

The scanning unit and the printing unit can be driven by separate driving sources. At this time, the moving speeds of the scanning unit and the printing unit can be the same or different.

According to another aspect of the present invention, paths for transporting the document and the printable medium are different. A first base frame located at the path for transporting the printable medium supports the printable medium, and a second base frame located at the path for transporting the document supports the document. The printing unit is located at the upper part of the first base frame and performs the printing operation on the printable medium by reciprocation on the printable medium, and the scanning unit is located at the upper part of the second base frame and scans the document by reciprocation perpendicular to the document transporting direction. Here, the scanning unit and the printing units are separately or simultaneously driven by means of a same driving source.

Preferably, the scanning unit and the printing unit receive the driving force from the driving source through a belt.

According to the present invention, a power unit for transporting is further included for providing power to transport the document and the printable medium separately or simultaneously. Preferably, the power unit for transporting includes a transporting motor; a decelerating gear for decelerating the driving force generated by the transporting motor; driving units for transporting the document and the printable medium which transmits the decelerated driving force to a document transporting roller and a printable medium transporting roller, respectively; and power switching devices for transporting the document and the printable medium which control the delivery of the driving force to the document transporting roller and the printable medium transporting roller in accordance with the control of the driving units for transporting the document and the printable medium.

According to another aspect of the present invention, the first base frame supports the printable medium and the second base frame supports the document. The printing unit is located to face the first base frame and prints data on the printable medium by performing reciprocation on the printable medium, and the scanning unit is located to face the second base frame and scans the document by performing reciprocation on the document perpendicular to the document transporting direction. The driving force generated by a driving force generating unit transmits the driving force to the printing unit and the scanning unit through first and second driving force transmitting units. The driving force generating unit is connected to one of the first and second driving force transmitting units, and drives the printing unit and the scanning units separately or simultaneously.

Preferably, the first driving force transmitting unit includes a driving pulley connected to the driving force generating unit and a first driven pulley connected to the driving pulley by means of a first belt to which the printing unit is connected. Moreover, the second driving force transmitting unit includes a second driven pulley connected to the driving pulley by means of a second belt and a third driven pulley connected to the second driven pulley by means of a third belt to which the scanning unit is connected.

Preferably, the driving force generating unit includes a stepping motor.

Selectively, the first base frame and the second base frame can be shared as a common base frame, and it is possible to form a common path for transporting the document and the printable medium. In that case, the printing unit can be located at the upper part of the common base frame, and the scanning unit can be located at the lower part of the common base frame, facing each other.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A and 2B are front sectional views illustrating the first embodiment of a multifunctional machine performing the shuttle scanning according to the present invention; in which, FIG. 2A is a view illustrating the case where the distance between the scanning unit and the printing unit is short when the reciprocation is performed; and FIG. 2B is a view illustrating the case where the distance between the scanning unit and the printing unit is long when the reciprocation is performed;

DETAILED DESCRIPTION OF THE PREFERRED EMBODIMENTS

The objects, characteristics and advantages of the above-described invention will be more clearly understood through the preferable embodiments referring to the attached drawings.

As the terms mentioned later are determined based upon the function of the present invention, and they can be changed according to the technician's intention or a usual practice, the terms should be determined considering the overall contents of the specification of the present invention.

Figure 1:
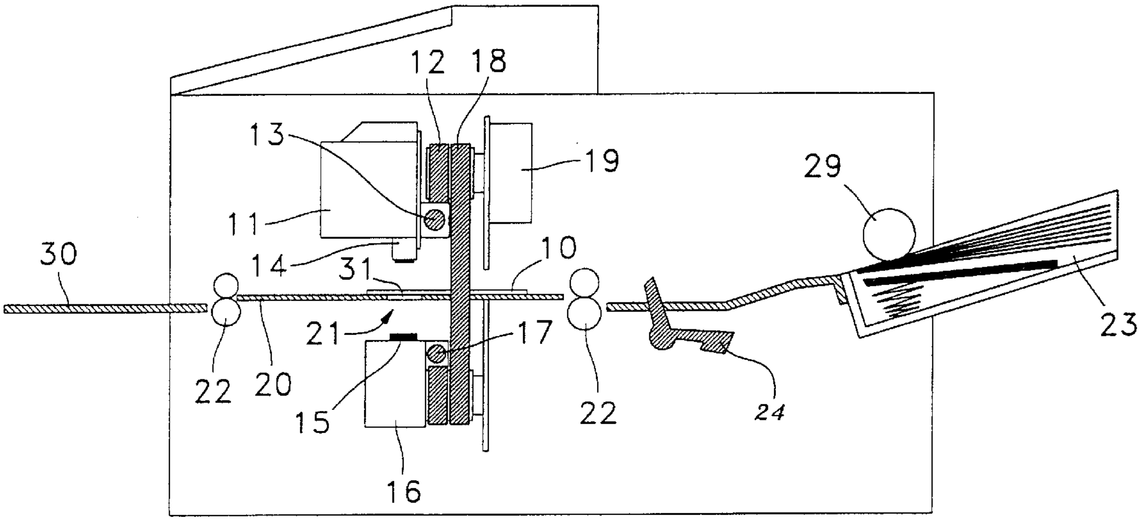
FIG. 1 is a side sectional view illustrating a first embodiment of a multifunctional machine performing the shuttle scanning according to the present intention.
Figure 4:
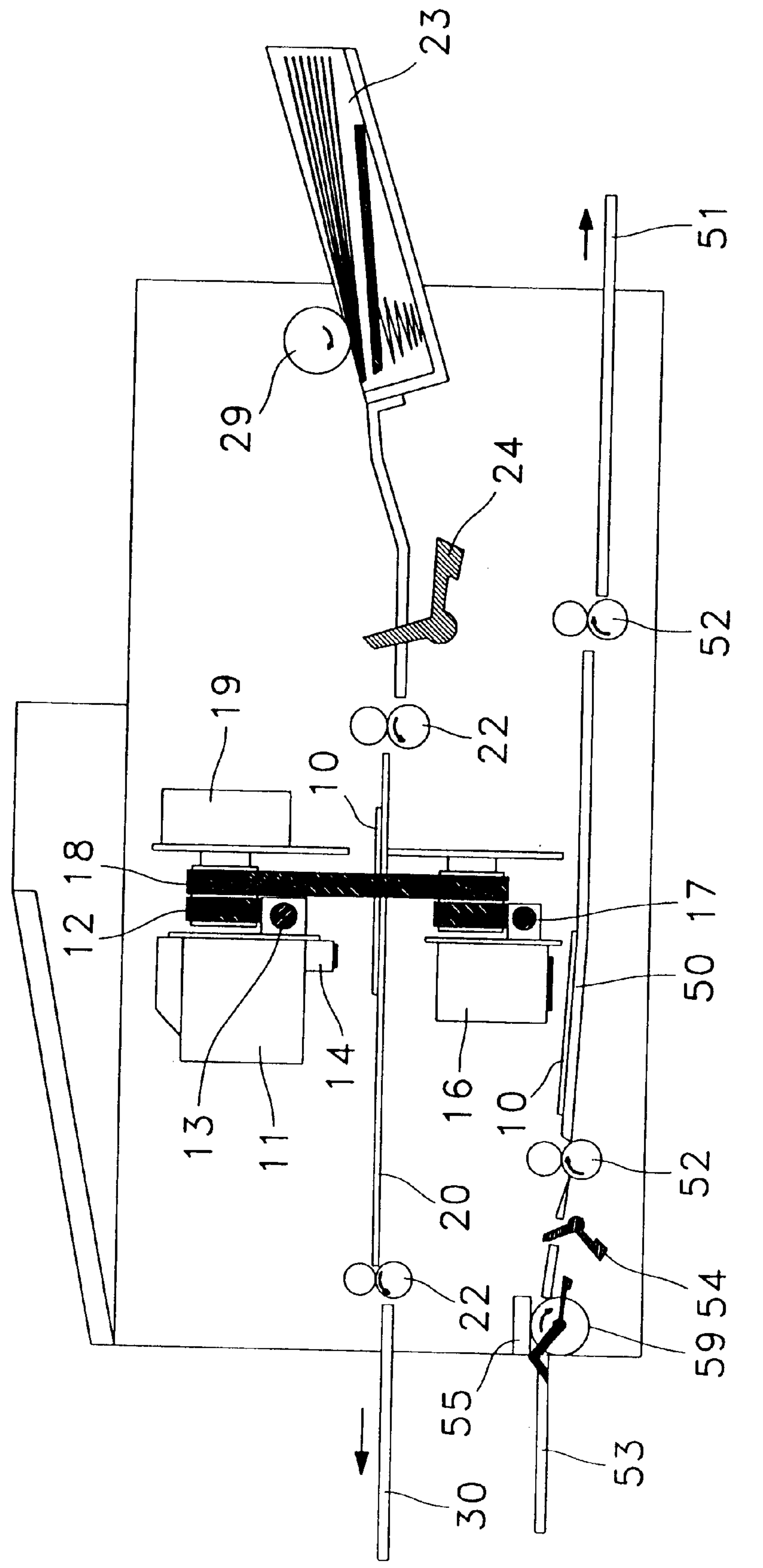
FIG. 4 is a side sectional view illustrating a second embodiment of the multifunctional machine performing the shuttle scanning according to the present invention.

Preferred embodiments of the present invention are respectively shown in FIGS. 1 and 4. The common structure of the present invention will be described hereinafter. A scanning unit 16 scans a document 10 by reciprocating in a direction perpendicular to the document transporting direction; a printing unit 11 prints on the printable medium 10 by reciprocating in a direction perpendicular to the printable medium transporting direction, and the printing unit 11 and the scanning unit 16 are separated from each other by as much as a predetermined distance respectively perpendicular to the reciprocating direction and the transporting direction.

According to FIG. 1, the printing unit 11 and the scanning unit 16 are respectively opposite to each other, and a path for transporting the document and the printable medium 10 is formed therebetween.

According to FIG. 4, the printing unit 11 and the scanning unit 16 are formed in the same direction, and the path for transporting the document and the printable medium 10 are respectively oppositely formed relative to the scanning unit 16 and the printing unit 11.

Moreover, preferably, the printing unit 11 and the scanning unit 16 are simultaneously driven by one carriage motor 19.

Referring to FIGS. 1 and 2, there is shown a multifunctional machine performing a shuttle scanning according to a first preferred embodiment of the present invention.

As shown in the drawings, a path (i.e., from a cassette 23 to an output tray 30) is used for transporting both a document and a printable medium. Between the register rollers 22 located at the transporting path, a base frame 20 is provided to support the document and the printable medium. At the upper and lower parts of the base frame 20, a printing unit 11 and a scanning unit 16 are established, respectively, facing each other. The printing unit 11 is established so that a printhead 14 can face the lower side, and the scanning unit 16 is established so that a scanner head 15 can face the upper side. A slot 21 is formed at a part of the base frame 20 facing the scanner head 15 of the scanning unit 16 in a latitudinal direction of the base frame 20. The width of the slot 21 is adjusted so that the scanner head 15 can perform the scanning, and the length of the slot 21 is adjusted so that the supplied document can be received. Preferably, a protection plate 31 of a transparent material can be inserted into the slot 21.

The printing unit 11 includes the ink-jet printhead 14 performing the printing on the printable medium and it is attached to a transporting belt 12. The transporting belt 12 attaches a carriage motor 19 to a driving pulley 25*b* and a driven pulley 25*a,* and the printing unit 11 can perform the reciprocation perpendicular to the transporting direction of the printable medium 10. Moreover, the printing unit 11 is attached to a guide shaft 13 so that an even interval between the printing unit 11 and the printable medium can be ensured.

The scanning unit 16 includes the scanning head 15 for scanning the data on the document, and it is attached to the transporting belt 28. The transporting belt 28 attaches a driven pulley 25*c,* which is connected to the driving pulley 25*b* by means of a driving force transmitting belt 18, to a driven pulley 25*d,* and the scanning unit 16 can perform the reciprocation perpendicular to the transporting direction of the document. Moreover, the scanning unit 16 is attached to a guide shaft 17 so that an even interval between the scanning unit and the document can be ensured.

The document or the printable medium 10 is stacked in the cassette 23 and the stacked document or the printable medium 10 is successively supplied by the pickup roller 29. On the path of the document and the printable medium 10, a register sensor 24 and the register rollers 22 are provided.

The printing unit 11 and the scanning unit 16 can be connected to the transporting belt so that they are transported simultaneously in the same direction by the carriage motor 19. In other words, referring to FIG. 2A, the printing unit 11 and the scanning unit 16 are connected to the lower parts of the transporting belts 12 and 28, respectively, so that they can be driven in the same direction as the carriage motor 19 operates. In this embodiment, the printing unit 11 and the scanning unit 16 are connected to the lower parts of the transporting belts 12 and 28. It is possible to connect the printing unit 11 and the scanning unit 16 to the upper parts of the transporting belts. Preferably, the printing unit 11 and the scanning unit 16 are separated from each other by as much as a predetermined distance L.

Moreover, it is possible to connect the printing unit 11 and the scanning unit 16 to the transporting belts so that they are transported in the opposite directions simultaneously by the carriage motor 19. In other words, referring to FIG. 2B, the printing unit 11 and the scanning unit 16 are connected to the lower part of the transporting belt 12 and the upper part of the transporting belt 28, respectively. In this embodiment, the printing unit 11 and the scanning unit 16 are connected to the lower part of the transporting belt 12 and the upper part of the transporting belt 28, respectively. It is possible to connect the printing unit 11 and the scanning unit 16 to the upper part of the transporting belt 12 and the lower part of the transporting belt 28, respectively. Moreover, the printing unit 11 and the scanning unit 16 are separated from each other by as much as L corresponding to the width where the reciprocation is performed.

The carriage motor 19 is a motor capable of being rotated directly/inversely, such as a stepping motor.

In the embodiment, the axis of the carriage motor 19 is connected to one of the pulleys 25*a* and 25*b,* which are connected to each other by means of the transporting belt 12 for transporting the printing unit 11. It is possible to connect the axis of the carriage motor 19 to one of the pulleys 25*c* and 25*d,* which are connected to each other by means of the transporting belt 28 for transporting the scanning unit 16. In these cases, the transporting belts 12 and 28 should be connected to each other. Here, the transporting belts are connected to each other by means of the transmitting belt 18.

Figure 3:
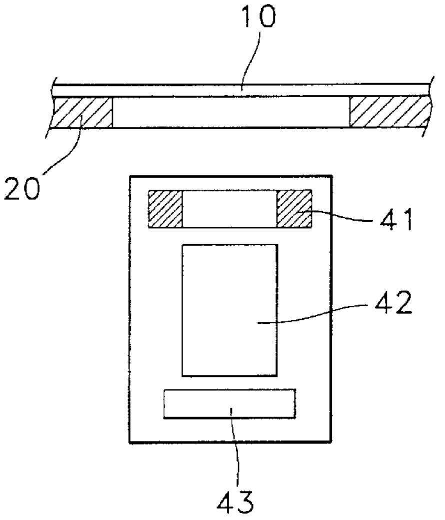
FIG. 3 is a sectional view illustrating the scanning unit according to the present invention.

FIG. 3 is a sectional view illustrating the scanning unit employing the present invention. When a lamp 41 inside of the scanning unit 16 radiates light on the document 10, the light reflected by the surface of the document 10 arrives at an optical sensor 43 through a lens 42, thereby scanning the document.

The operation of the multifunctional machine performing the shuttle scanning according to the first embodiment of the prevent invention, having the above-described structure, will be explained as follows.

First, in the case of scanning the document, the document 10 to be scanned is stacked in the cassette 23, with the surface containing data faced upside. When the document starts to be loaded by a selection key, the transporting motor is driven and the pickup roller 29 is also driven, and thereby the document 10 is successively supplied to the transporting path by the pickup roller 29.

After forming a loop at the register sensor 24 and the register roller 22 for forward edge alignment, the document 10 stops moving when its forward edge arrives at a position corresponding to the slot 21 formed at the base frame by the power switching device or by power switching caused by the inversion of the transporting motor.

At this time, as the document 10 is located so that the surface containing data can face downward, the document 10 on the base frame 20 faces the scanner head 15 of the scanning unit 16, and the back side of the document 10 faces the printing unit 11. Accordingly, it is possible to prevent the surface of the document 10 from being contaminated by the printing unit 11. Moreover, in the case where the protection plate 31 made of a transparent material is mounted inside of the slot 21, it is possible to prevent the scanner head 15 of the scanning unit 16 from being contaminated by an alien substance attached to the surface of the document.

When the document 10 stops, the carriage motor 19 such as the stepping motor is driven and the driving pulley 25*b* connected to the axis of the carriage motor 19 is rotated. The rotation of the driving pulley 25*b* is transmitted to the driven pulley 25*c* through the transmitting belt 18. After that, it is transmitted to the driven pulley 25*d* through the transporting belt 28 to which the scanning unit 16 is connected. Moreover, it is transmitted to the driven pulley 25*a* through the transporting belt 12 to which the printing unit 11 is connected. Here, the scanning unit 16 and the printing unit 11 perform a rectilinear movement perpendicular to the transporting direction of the document 10.

According to the rotation of the carriage motor 19, the scanning unit 16 moves along the guide shaft 17 from a home position 27, thereby scanning the data on the document 10. The scanning unit 16 maintains an even interval with respect to the document 10 by the guide shaft 17. After the scanning unit 16 scans the document by as much as a predetermined width, the carriage motor 19 stops and performs the next operation. At this time, in the case of bidirectional scanning, by driving the transporting motor, the document 10 is transported by as much as a predetermined length and the part to be scanned is located to face the slot 21. After that, as the carriage motor 19 is rotated again in the inverse direction under the control of a central processing unit, the scanning unit 16 moves toward the home position 27, and the data on the document is scanned. On the other hand, in the case of monodirectional scanning, the carriage motor 19 is rotated again in the reverse direction under the control of the central processing unit, and the scanning unit 16 is placed at the home position 27. After that, the document 10 is transported by as much as a predetermined length by driving the transporting motor, and the part to be scanned is located so as to face the slot 21. The above-described process for scanning the document is repeatedly performed until the transportation of the document is completed.

The scanned data is converted into a digital signal, and it is transmitted to a memory (not illustrated). In the case where the data is transmitted to the outside, it is transmitted through a line interface and a modem.

The printing operation is explained as follows. First, the printable medium 10 to be printed is stacked in the cassette 23. The transporting motor is driven by the selection key and the pickup roller is also driven. The printable medium 10 is successively supplied to the transporting path by the pickup roller 29.

After the printable medium 10 arrives at an image forming area on the base frame 20 through the control of the position and the forward edge alignment by the register roller 22 and the register sensor 24, the printable medium 10 stops by the power switching device or by the power switching caused by the inversion of the transporting motor.

At this time, the surface of the printable medium 10 stopped at the base frame 20 faces the printing unit 11, and the backside of the printable medium faces the scanning unit 16. As a result, it prevents the image on the printable medium formed by the printing unit 11 from being contaminated by the scanning unit 16.

Figure 2A:
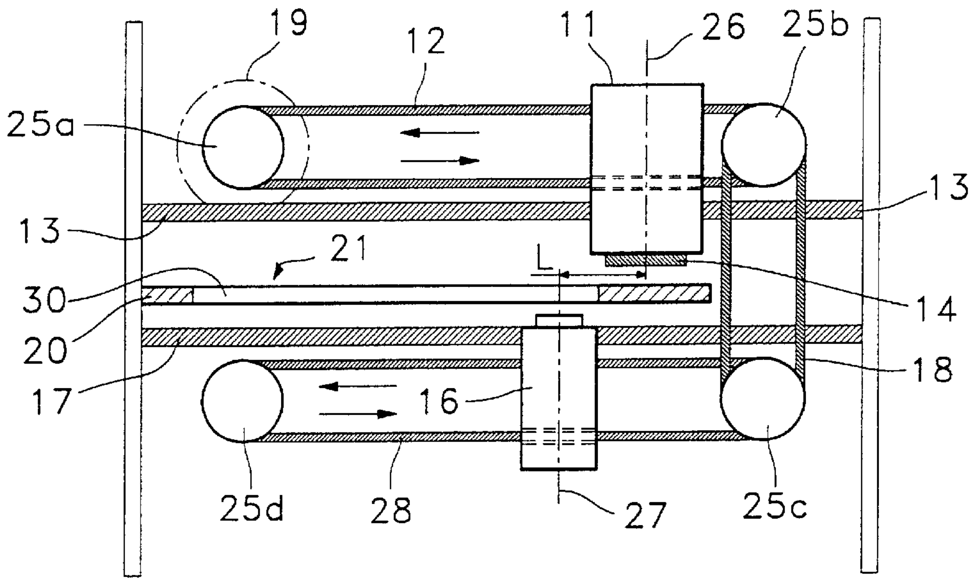
Figure 2B:
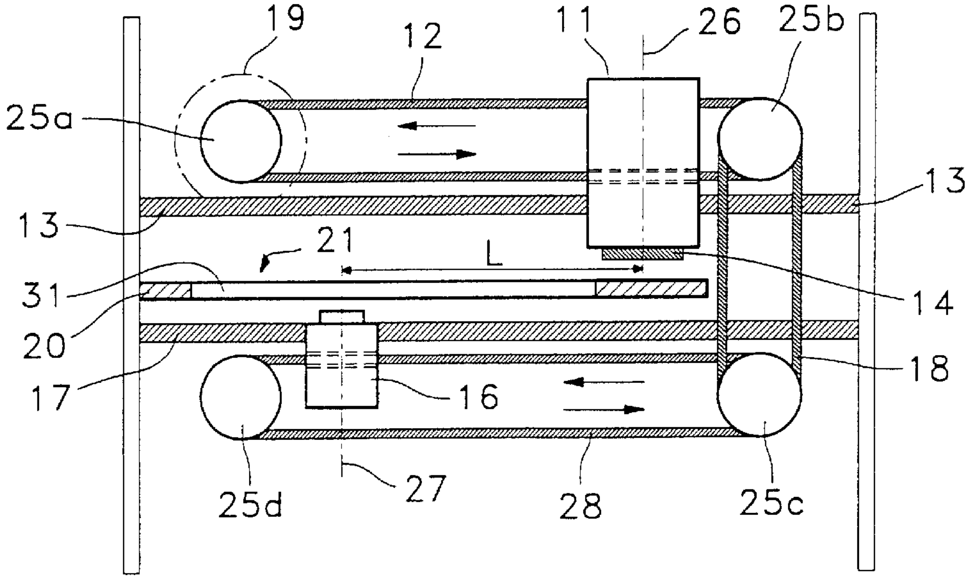

When the printable medium 10 stops, the carriage motor 19 is driven, and the driving pulley 25*b* connected to the axis of the carriage motor 19 is rotated. The rotation of the driving pulley 25*b* is transmitted to the driven pulley 25*a* through the transporting belt 12 to which the printing unit 11 is connected. Here, the printing unit 11 and the scanning unit 16 perform rectilinear movement in a direction perpendicular to the transporting direction of the printable medium 10. The rectilinear movement of the scanning unit 16 and the printing unit 11 can be performed in the same direction, as shown in FIG. 2A. The movement can also be performed in the opposite directions, as shown in FIG. 2B. Here, in the case where the directions of the rectilinear movement are the same, as the scanning unit 16 and the printing unit 11 are separated from each other by as much as a predetermined distance L, it prevents the scanning unit 16 from being contaminated by ink injected from the printing unit 11. Conversely, in the case wherein the directions of the rectilinear movement are opposite directions with respect to each other, it is possible to prevent the scanning unit 16 from being contaminated by ink injected from the printing unit 11 by establishing the home positions 27 and 26 of the scanning unit 16 and the printing unit 11, respectively, at the ends where the reciprocation movements are performed.

As the carriage motor 19 rotates, the printing unit 11 moves from the home position 26 along the guide shaft 13 and forms the image on the printable medium 10. The printing unit 11 can maintain a predetermined distance with the printable medium by the guide shaft 13. After the printing unit 11 prints data on the printable medium by as much as a predetermined width, the carriage motor 19 stops driving the transporting motor, and the part to be scanned is located corresponding to the image forming area by transporting the printable medium. After that, the carriage motor 19 is rotated again in the inverse direction under the control of the central processing unit, and the printing unit 11 moves toward the home position 26, thereby printing on the printable medium. The above-described process is repeatedly performed until the transportation of the printable medium is completed.

As described above, by establishing the scanning unit and the printing unit facing each other, it is possible to prevent the surface of the document from being contaminated by contact with the printhead of the printing unit when performing the scanning operation. Moreover, it can prevent damage to the image on the surface of the document caused by contact between the surface of the document and the pickup roller, and it is possible to prevent the damage to the image caused by contact between the scanning unit and the printable medium when performing the printing operation.

Figure 5:
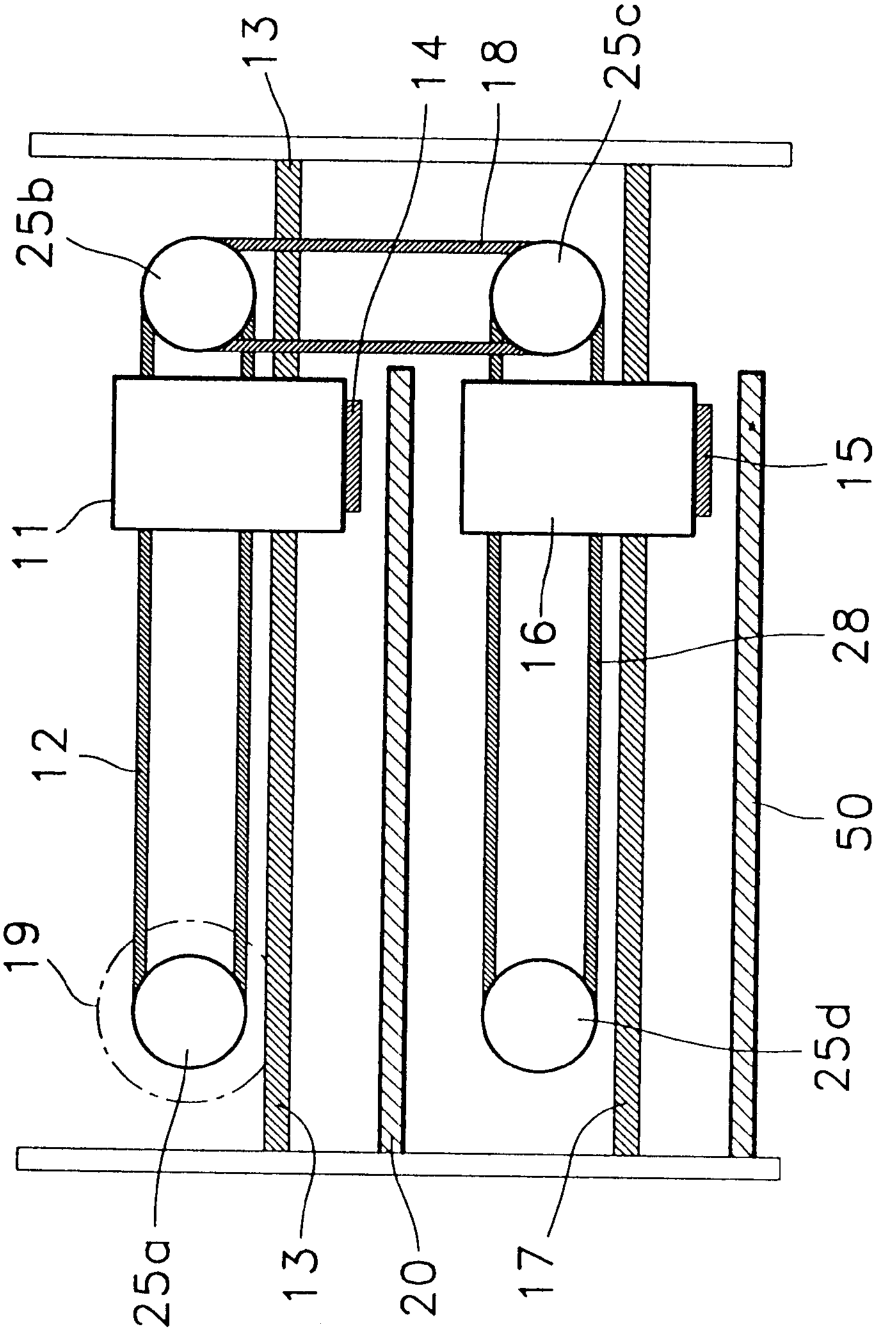
FIG. 5 is a front sectional view illustrating a second embodiment of the multifunctional machine performing the shuttle scanning according to the present invention.

Referring to FIGS. 4 and 5, there is shown a multifunctional machine performing shuttle scanning according to the second embodiment of the present invention.

As shown in the drawing, the path for transporting the printable medium 10 from the cassette 23 to the output tray 30 is along a first direction, and the path for transporting the document 10 from the document stacker 53 to the output tray 51 is along a second direction opposite to the first direction, which is separately located at the lower part of the path transporting the printable medium. Although the first direction is indicated as being opposite to the second direction in the embodiment, it is possible that the first direction and the second direction are the same.

Moreover, a first base frame 20 is located between the register rollers 22 which are provided on the path for transporting the printable medium to support the printable medium 10. At the upper part of the first base frame 20, the printing unit 11 is connected to the transporting belt 12 so that the printhead 14 can face the lower side. The transporting belt 12 connects the driving pulley 25*b* and the driven pulley 25*a* connected to the axis of the carriage motor 19, and enables the printing unit 11 to be reciprocated in a direction perpendicular to the direction for transporting the printable medium 10. Moreover, the printing unit 11 is connected to the guide shaft 13 so that an even interval between the printing unit and the printable medium can be ensured.

A second base frame 50 is located between the register rollers 52, provided on the path for transporting the document 10, to support the document 10. At the upper part of the second base frame 50, the scanning unit 16 is connected to the transporting belt 28 so that the scanning head 15 can face the lower side. The transporting belt 28 connects the driven pulley 25*c,* which is connected to the driving pulley 25*b* through the driving force transmitting belt 18, to the driven pulley 25*d,* and enables the scanning unit 16 to be reciprocated in a direction perpendicular to the direction for transporting the document 10. Moreover, the scanning unit 16 is connected to the guide shaft 17 so that an even interval between the scanning unit 16 and the document can be ensured. Preferably, the guide shaft 17 is separated from the guide shaft 13 in the downward direction, and is established parallel to the guide shaft 13.

The printable medium 10 is stacked in the cassette 23 and the stacked printable media are successively supplied by the pickup roller 29. On the path for transporting the printable medium, the register sensor 24 and the register rollers 22 are located. Moreover, the document 10 is stacked in the document stacker 53 and the stacked documents 10 are successively supplied by the pickup roller 59 and the friction pad 55 formed at the upper part of the pickup roller 59. On the path for transporting the document, the register sensor 54 and the register rollers 52 are provided.

To drive the printing unit 11 and the scanning unit 16, one carriage motor 19 is used. In the embodiment, the axis of the carriage motor 19 is connected to one of the pulleys 25*a* and 25*b,* which are connected to each other by the belt 12 which transports the printing unit 11. Also, the axis of the carriage motor 19 can be connected to one of the pulleys 25*c* and 25*d,* which are connected to each other by the belt 28 which transports the scanning unit 16. Here, the transporting belts 12 and 28 should be connected. In this embodiment, the transporting belts 12 and 28 are connected by means of the transmitting belt 18. Preferably, the carriage motor is a motor capable of being rotated directly and inversely, such as a stepping motor.

The ratio of the traveling speeds of the printing unit 11 and the scanning unit 16 can be set as 1:1 by designating the diameters of the driven pulleys 25*a,* 25*b* and 25*c* to be the same. Alternatively, by differently designating the diameters of the driven pulleys 25*a,* 25*b* and 25*c,* the respective traveling speeds of the printing unit 11 and the scanning unit 16 can be set to have a predetermined multiple ratio relationship.

Figure 6:
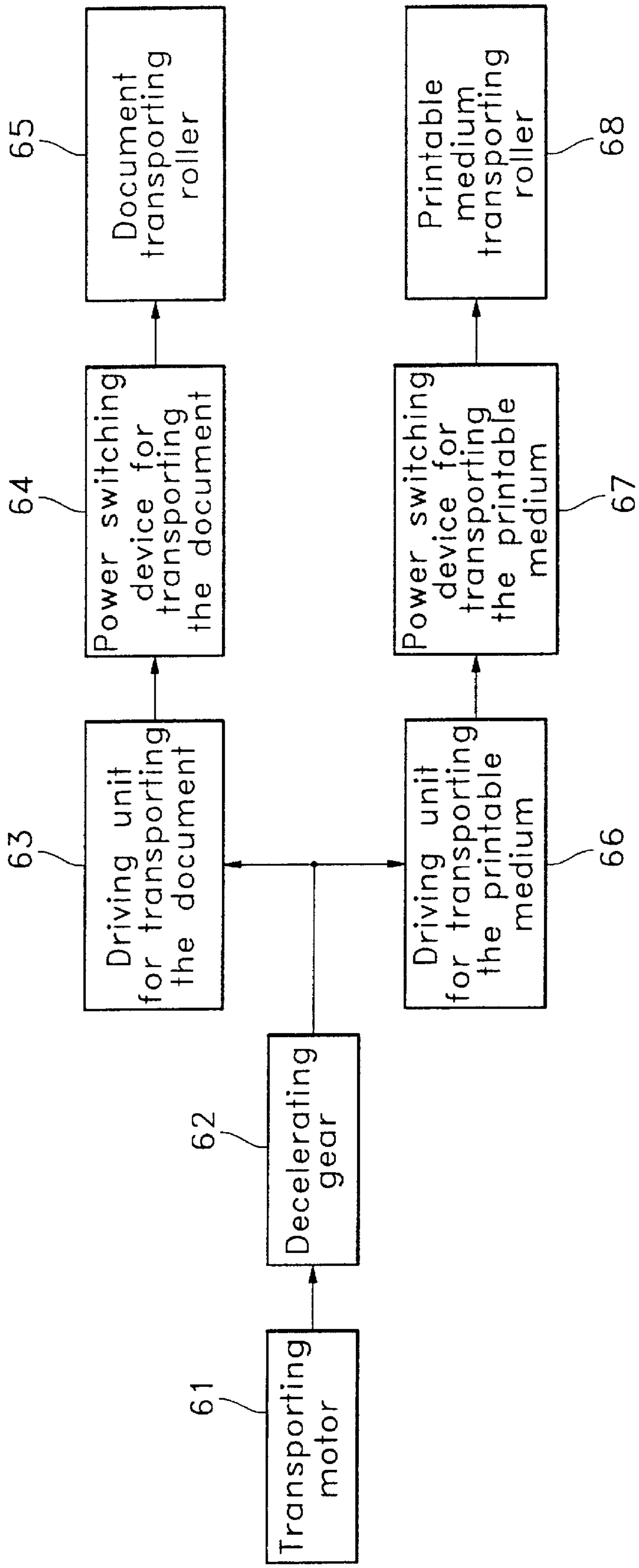
FIG. 6 is a block diagram illustrating the process for transmitting power which transports a document and a printable medium according to the present invention.

Referring to FIG. 6, a transporting motor 61 is used for transporting the document and the printable medium according to the present invention. The driving force generated by the transporting motor 61 is decelerated through the decelerating gear 62, and the decelerated driving force is transmitted to the driving unit 63 for transporting the document and the driving unit 66 for transporting the printable medium, respectively. The driving unit 63 for transporting the document and the driving unit 66 for transporting the printable medium, which receive the driving force, control the power switching device 64 for transporting the document and the power switching device 67 for transporting the printable medium, respectively, and they transmit the power to the document transporting roller 65 and the printable medium transporting roller 68, respectively. Accordingly, the driving force of the transporting motor 61 can be supplied to the transporting rollers 65 and 68 separately or simultaneously.

At this time, as illustrated in FIG. 4, the document transporting roller 65 indicates the pickup roller 59 and the register rollers 52, and the printable medium transporting roller 68 indicates the pickup roller 29 and the register rollers 22.

The operation of the multifunctional machine performing shuttle scanning according to the second embodiment of the present invention, having the above-described structure, will be explained as follows.

The scanning operation will be described first. When the documents 10 are stacked in the document stacker 53 and the document is loaded by the selection key, the transporting motor 61 is driven. The driving force generated by the transporting motor 61 is decelerated through the decelerating gear 62, and the decelerated driving force is transmitted to the driving unit 63 for transporting the document and to the driving unit 66 for transporting the printable medium, respectively. After that, the driving unit 63 for transporting the document which receives the driving force turns on the power switching device for transporting the document, and drives the document pickup roller 59 and the register roller 52. At this time, as the surface of the document 10 is contacted by the friction pad 55 and the backside of the document 10 is contacted by the pickup roller 59, the surface of the document 10 is not damaged by the pickup roller 59.

After forming the loop at the register sensor 54 and the register roller 52 for forward edge alignment, the forward edge of the document 10 is stopped at the image scanning area on the second base frame 50 by the power switching device 64 for transporting the document, or as a result of the power switching by the inversion of the transporting motor 61.

When the document 10 stops, the carriage motor 19 is driven, and the driving pulley 25*b* connected to the axis of the carriage motor 19 is rotated. The rotation of the driving pulley 25*b* is transmitted to the driven pulley 25*c* through the transmitting belt 18, and to the driven pulley 25*d* through the transporting belt 28 connected to the scanning unit 16. Here, the scanning unit 16 performs the rectilinear movement in a direction perpendicular to the transporting direction of the document 10.

At this time, the scanning unit 16 moves along the guide shaft 17 and scans data on the document 10. The scanning unit 16 can maintain an even interval with the document by means of the guide shaft 17. The above-described scanning is repeatedly performed until the transportation of the document is finished.

The scanned data is converted into a digital signal and transmitted to the memory, and it is transmitted to the outside through the line interface and the modem.

Now, the printing operation is explained as follows. First, when the printable medium 10 is stacked in the cassette 23 and the transporting motor 61 is driven by the selection key, the driving force generated by the transporting motor 61 is decelerated through the decelerating gear 62. The decelerated driving force is transmitted to the driving units 63 and 66, respectively, for transporting the printable medium. The driving unit 66 for transporting the printable medium which receives the driving force, turns on the power switching device 67 for transporting the printable medium and drives the printable medium pickup roller 29 and the register roller 22.

After arriving at the image forming area on the first base frame 20 through the forward edge alignment and the control of the position by the register roller 22 and the register sensor 24, the printable medium 10 stops as a result of power switching caused by the inversion of the transporting motor 61 or the power switching device 67.

When the printable medium 10 stops, the carriage motor 19 is driven simultaneously, and the driving pulley **25*b* connected to the axis of the carriage motor 19 is rotated. The rotation of the driving pulley 25*b* is transmitted to the driven pulley 25*a* through the transporting belt 12 to which the printing unit 11 is connected. Here, the printing unit 11 performs the rectilinear movement in a direction perpendicular to the transporting direction of the printable medium 10**.

As the carriage motor 19 rotates, the printing unit 11 moves along the guide shaft 13 and forms the image on the printable medium 10. The printing unit 11 can maintain an even interval with the printable medium by means of the guide shaft 13. The above-described printing operation can repeatedly be performed until the transportation is completed.

In the present invention, it is possible to print the stored data which is scanned by adding a memory capable of temporarily storing the scanned data. Accordingly, it provides a function of copying the document wherein the printing operation can be performed immediately after the predetermined line of the document is scanned. When performing the function of copying the document, the length of the document which is scanned once by the scanning unit 16 through reciprocation and the length of the printable medium which is printed once by the printing unit 11 through reciprocation can be set to be same or to be multiple numbers.

The present invention relates to a multifunctional machine, and particularly to a multifunctional machine which prevents the contamination caused by the contact of a document and a printhead by placing the printhead to face a base frame supporting a printable medium, and by placing a scanner to face the base frame supporting the document.

Further, the present invention relates to a multifunctional machine capable of simplifying structure and reducing manufacturing costs by sharing the base frame for supporting the printable medium, and the document and by moving the printhead and the scanner using one driving motor.

While there have been illustrated and described what are considered to be preferred embodiments of the present invention, it will be understood by those skilled in the art that various changes and modifications may be made, and equivalents may be substituted for

What is claimed is:

1. A multifunctional machine having a path for transporting both a document and a printable medium, comprising:

a base frame which is located at said transporting path and supports said document and said printable medium;

document scanning means for scanning said document by reciprocating on said document in a direction perpendicular to a direction in which said document is transported; and printing means which is located to face said document scanning means centering around said base frame for printing on said printable medium by reciprocating on said printable medium in a direction perpendicular to a direction in which said printable medium is transported;

wherein a slot is formed on said base frame, said slot having a length corresponding to a width wherein said scanning means reciprocates;

said machine further comprising a protection plate of transparent material permanently mounted in said slot.

2. A multifunctional machine of claim 1, wherein said document scanning means and said printing means are simultaneously driven by one driving source.

3. The multifunctional machine of claim 2, wherein said document scanning means and said printing means receive a driving force from said one driving source through a belt.

4. The multifunctional machine of claim 1, wherein said scanning means and said printing means reciprocate in opposite directions, and are separated from each other by as much as a width wherein said scanning means and said printing means reciprocate.

5. A multifunctional machine having a path for transporting both a document and a printable medium, comprising:

a base frame which is located at said transporting path and supports said document and said printable medium;

document scanning means for scanning said document by reciprocating on said document in a direction perpendicular to a direction in which said document is transported;

printing means which is located to face said document scanning means centering around said base frame for printing on said printable medium by reciprocating on said printable medium in a direction perpendicular to a direction in which said printable medium is transported;

a first guide shaft for guiding the reciprocating of said scanning means; and a second guide shaft for guiding the reciprocating of said printing means, said second guide shaft being located apart from and parallel to said first guide shaft.

6. The multifunctional machine of claim 5, wherein said document scanning means and said printing means are simultaneously driven by one driving source.

7. The multifunctional machine of claim 6, wherein said document scanning means and said printing means receive a driving force from said one driving source through a belt.

8. The multifunctional machine of claim 5, wherein a slot is formed on said base frame, said slot having a length corresponding to a width wherein said scanning means reciprocates.

9. The multifunctional machine of claim 8, further comprising a protection plate of transparent material inserted into said slot.

10. The multifunctional machine of claim 5, wherein said scanning means and said printing means reciprocate in opposite directions and are separated from each other by as much as a width wherein said scanning means and said printing means reciprocate.

11. A multifunctional machine having a path for transporting both a document and a printable medium, comprising:

a base frame which is located at said transporting path and supports said document and said printable medium;

document scanning means for scanning said document by reciprocating on said document in a direction perpendicular to a direction in which said document is transported; and printing means which is located to face said document scanning means centering around said base frame for printing on said printable medium by reciprocating on said printable medium in a direction perpendicular to a direction in which said printable medium is transported;

wherein said scanning means and said printing means reciprocate in a same direction and are separated from each other by as much as a predetermined distance perpendicular to the respective directions in which said document and said printable medium are transported.

12. The multifunctional machine of claim 11, wherein said document scanning means and said printing means are simultaneously driven by one driving source.

13. The multifunctional machine of claim 12, wherein said document scanning means and said printing means receive a driving force from said one driving source through a belt.

14. The multifunctional machine of claim 11, wherein a slot is formed on said base frame, said slot having a length corresponding to a width wherein said scanning means reciprocates.

15. The multifunctional machine of claim 14, further comprising a protection plate of transparent material inserted into said slot.

16. The multifunctional machine of claim 11, wherein said scanning means and said printing means reciprocate in opposite directions and are separated from each other by as much as a width wherein said scanning means and said printing means reciprocate.

17. A multifunctional machine having a path for transporting both a document and a printable medium, comprising:

a base frame which is located at said transporting path and supports said document and said printable medium;

document scanning means for scanning said document by reciprocating on said document in a direction perpendicular to a direction in which said document is transported; and printing means which is located to face said document scanning means centering around said base frame for printing on said printable medium by reciprocating on said printable medium in a direction perpendicular to a direction in which said printable medium is transported;

wherein said scanning means and said printing means are driven by separate driving sources.

18. The multifunctional machine of claim 17, wherein said document scanning means and said printing means are simultaneously driven by one driving source.

19. The multifunctional machine of claim 18, wherein said document scanning means and said printing means receive a driving force from said one driving source through a belt.

20. The multifunctional machine of claim 17, wherein a slot is formed on said base frame, said slot having a length corresponding to a width wherein said scanning means reciprocates.

21. The multifunctional machine of claim 20, further comprising a protection plate of transparent material inserted into said slot.

22. The multifunctional machine of claim 17, wherein said scanning means and said printing means reciprocate in opposite directions and are separated from each other by as much as a width wherein said scanning means and said printing means reciprocate.

23. The multifunctional machine of claim 17, wherein said scanning means and said printing means have identical traveling speeds.

24. The multifunctional machine of claim 17, wherein said scanning means and said printing means have different respective traveling speeds.

* * * * *